US011144111B1

(12) United States Patent
Hoke et al.

(10) Patent No.: US 11,144,111 B1
(45) Date of Patent: Oct. 12, 2021

(54) INTELLIGENT ADAPTIVE ENTITIES

(71) Applicant: Rockwell Collins, Inc., Cedar Rapids, IA (US)

(72) Inventors: Jaclyn A. Hoke, Marion, IA (US); Matthew M. Lorch, Alburnett, IA (US); Subhashish Chakravarty, Marion, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 192 days.

(21) Appl. No.: 15/412,486

(22) Filed: Jan. 23, 2017

(51) Int. Cl.
  *G06F 3/01* (2006.01)
  *G09B 9/00* (2006.01)
  *G09B 9/30* (2006.01)
  *G09B 9/24* (2006.01)
  *G06N 20/00* (2019.01)

(52) U.S. Cl.
  CPC ............ *G06F 3/011* (2013.01); *G06N 20/00* (2019.01); *G09B 9/00* (2013.01); *G09B 9/003* (2013.01); *G09B 9/245* (2013.01); *G09B 9/302* (2013.01); *G09B 9/308* (2013.01)

(58) Field of Classification Search
  CPC ...... G06F 3/011; G06N 99/005; G06N 20/00; G09B 9/308; G09B 9/245; G09B 9/003; G09B 9/00; G09B 9/302
  See application file for complete search history.

(56) References Cited

U.S. PATENT DOCUMENTS

| | | | | |
|---|---|---|---|---|
| 9,605,926 | B1 * | 3/2017 | Means | F41G 3/26 |
| 2002/0072414 | A1 * | 6/2002 | Stylinski | A63F 13/12 463/42 |
| 2007/0066403 | A1 * | 3/2007 | Conkwright | A63F 13/10 463/43 |
| 2008/0268943 | A1 * | 10/2008 | Jacob | A63F 13/10 463/23 |
| 2011/0009193 | A1 * | 1/2011 | Bond | A63F 13/42 463/36 |
| 2014/0322674 | A1 * | 10/2014 | Livneh | G09B 9/302 434/30 |
| 2015/0309316 | A1 * | 10/2015 | Osterhout | G06F 3/0346 345/8 |

* cited by examiner

*Primary Examiner* — Stephen G Sherman
(74) *Attorney, Agent, or Firm* — Suiter Swantz pc llo

(57) ABSTRACT

A method includes displaying content including an environment, a user entity, and a synthetic entity. The user entity is controllable by a user with respect to the environment and the synthetic entity. The environment and the synthetic entity operate according to a pre-scripted scheme. The method further includes receiving user information. The user information is at least one of a user input and a current physiological state of the user. The method further includes modifying the pre-scripted scheme based on the user information and prior user information. The prior user information comprises at least one of a prior user input and a prior physiological state of the prior user received in response to an interaction of the prior user with the pre-scripted scheme.

6 Claims, 3 Drawing Sheets

INTELLIGENT ADAPTIVE ENTITIES

BACKGROUND

The inventive concepts disclosed herein relate generally to the field of simulation and training systems. More particularly, embodiments of the inventive concepts disclosed herein relate to adapting simulation and training environments, synthetic entities, and user entities for creating more complex and challenging training and simulation scenarios for a user.

Actions of synthetic entities within virtual environments are often pre-scripted, with little to no capability to autonomously adapt to a situation at hand without external human intervention. For example, some advanced training simulators require a human instructor to manually alter a characteristic of a synthetic entity or environment to adequately train a human trainee that has learned common routines and typical actions that a synthetic entity will take in response to a particular action. For example, in current simulation and training systems, an enemy aircraft in an air-to-air training or a mission planning computer simulated scenario will follow a set of pre-scripted maneuvers during the scenario and will not deviate from those actions without significant and time consuming intervention by an instructor. In another example, in current games in the entertainment industry, computer-generated entities will only re-spawn in several pre-programmed locations within the gaming environment. Once a user learns what pre-scripted events to expect, such scenarios become expected and routine, thereby reducing the potential for the user to learn and hone their skills and reducing the entertainment value of some games. Developing more intelligent and complex synthetic entities and adapting environments and user entities autonomously to deviate from pre-scripted events would lead to more complex and challenging training and simulation scenarios for a user and enabling increased opportunities for knowledge acquisition and increased realism.

SUMMARY

In one aspect, the inventive concepts disclosed herein are directed to a method. The method includes displaying content including an environment, a user entity, and a synthetic entity. The user entity is controllable by a user with respect to the environment and the synthetic entity. The environment and the synthetic entity operate according to a pre-scripted scheme. The method further includes receiving user information. The user information is at least one of a user input and a current physiological state of the user. The method further includes modifying the pre-scripted scheme based on the user information and prior user information. The prior user information comprises at least one of a prior user input and a prior physiological state of the prior user received in response to an interaction of the prior user with the pre-scripted scheme.

In a further aspect, the inventive concepts disclosed herein are directed to a system. The system includes at least one processor coupled with a non-transitory processor-readable medium storing processor-executable code. The code is configured to cause the at least one processor to display content including an environment, a user entity, and a synthetic entity. The user entity is controllable by a user with respect to the environment and the synthetic entity. The environment and the synthetic entity are configured to operate according to a pre-scripted scheme. The code is further configured to cause the at least one processor to receive user information. The user information is at least one of a user input and a current physiological state of the user. The code is further configured to cause the at least one processor to modify the pre-scripted scheme based on the user information and prior user information. The prior user information comprises at least one of a prior user input and a prior physiological state of the prior user received in response to an interaction of the prior user with the pre-scripted scheme.

In a further aspect, the inventive concepts disclosed herein are directed to a method. The method includes displaying content including an environment and a user entity. The user entity is controllable by a user with respect to the environment. The environment operates according to a pre-scripted scheme. The method further includes receiving user information. The user information is at least one of a user input and a current physiological state of the user. The method further includes modifying the pre-scripted scheme based on the user information and prior user information. The prior user information comprises at least one of a prior user input and a prior physiological state of the prior user received in response to an interaction of the prior user with the pre-scripted scheme.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
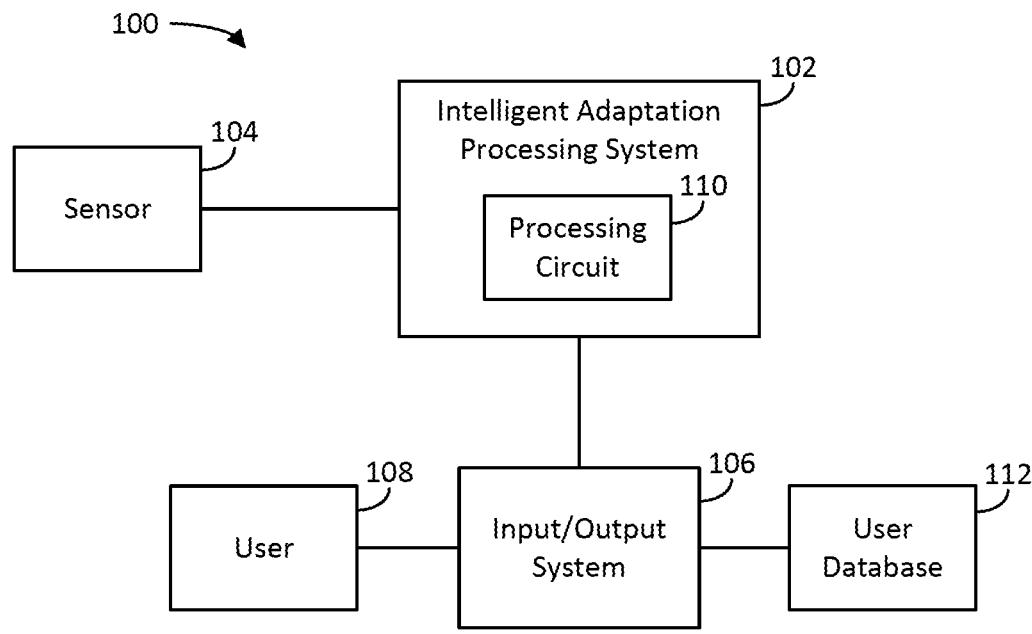
FIG. 1 is a block diagram of an exemplary embodiment of an artificial intelligence adaptation system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to intelligently adapting entities and intelligently adapting environments using an artificial intelligence adaptation system. The inventive concepts disclosed herein can be utilized in a number of various types of applications, simulators, training systems, and gaming systems. While the present disclosure describes systems and methods implementable for training systems, flight simulators for a pilot of an aircraft, or computerized gaming systems, the inventive concepts disclosed herein may be used in any type of environment for any purpose where smart and adaptable synthetic entities and synthetic environments would provide entertainment or assist in training and developing skills and mission planning operations. While certain examples and embodiments of the inventive concepts disclosed herein are described with respect to a pilot using a flight simulator, it will be appreciated that users other than a pilot may use and benefit from the inventive concepts disclosed herein with respect to other vehicles, objects, and scenarios other than aviation.

Referring now to FIG. 1, an artificial intelligence adaptation system 100 is shown according to the inventive concepts disclosed herein. The artificial intelligence adaptation system 100 includes intelligent adaptation processing system 102, a sensor 104, a user database 112, and an input/output system 106 configured to interface with a user 108. The intelligent adaptation processing system 102 includes a processing circuit 110. The user 108 may be any person interacting with the artificial intelligence adaptation system 100, such as a trainee (e.g., pilot, soldier, technician) or gamer using the system 100 for pleasure or sport. In some embodiments, the user 108 is a plurality of users. The plurality of users may each be friendly users (e.g., controlling user entities friendly to one another, on a same team, of a same nationality or allegiance) or a hostile users (e.g., each user hostile to one another), or a mixture of friendly and hostile users. Users 108 of a same allegiance may each be working toward a same goal or objective. For example, in one embodiment, a plurality of users may interact with the artificial intelligence adaptation system 100 over a networked environment using a common Service Advertisement Framework shared by multiple users.

The sensor 104 may be or include any type of sensor configured to measure a characteristic of the user 108. The sensor 104 may be configured to directly measure the characteristic of the user 108 or to generate data indicative of the characteristic of the user 108. The sensor 104 can be configured to measure biometrics of the user 108. For example, the sensor 104 can be configured to detect any physiological characteristic or change in physiological characteristic of the user 108, including facial expressions, perspiration, eye movement (e.g., eye gaze, focus, pupil dilation), tears, heartbeat (e.g., heart rate, heat beat intervals, heart rate variability), blood pressure, blood pressure variability, and so on. For example, the sensor 104 may be or include one or more cameras, microphones, electrodes, photoplethysmographic sensors, spectrometers, among other sensor types.

The input/output system 106 includes any system or device for communicating data between the user 106 and an environment of the user 106 with the intelligent adaptation processing system 102. The input/output system 106 includes one or more displays, speakers, haptic feedback devices, and user input elements configured to provide outputs to and receive inputs from the user 108.

The displays may be implemented using any of a variety of display technologies, including CRT, LCD, organic LED, dot matrix display, and others. For example, a display may include tablet computers, tablets such as an iPad® tablet manufactured by Apple, Inc., synthetic vision system displays, head up displays ("HUDs") with or without a projector, wearable displays, watches, Google Glass®, and so on. In some embodiments, the display is configured to function as simulation environment for a pilot sitting in a simulated cockpit wherein the cockpit is part of a user entity maneuvering in a synthetic environment with or without other synthetic entities present. The display includes a depiction of a virtual flight display that displays altitude, airspeed, vertical speed, and navigation and traffic collision avoidance system advisories. The displays may also be configured to function as, for example, a multi-function display used to display navigation maps, weather radar, electronic charts, TCAS traffic, aircraft maintenance data and electronic checklists, manuals, and procedures. Other types and functions of the display are contemplated and will be apparent to those skilled in the art. The speakers and haptic feedback devices may function to provide the user 108 with auditory and haptic feedback regarding any of the displayed data or regarding a displayed environment or scenario (e.g., a training scenario or gaming scenario). For example, the display provided to the user 108 may include a synthetic environment external to the cockpit of the user entity and various synthetic entities (e.g., aircraft or other vehicles). The other entities may be friendly entities, neutral entities, or enemy entities. The environment may be a training environment relating to at least one of combat training and commercial aviation. In some embodiments, the environment is a commercial flight simulation environment and the user entity is a simulated commercial aircraft. In some embodiments, the user 108 is positioned inside of a flight simulator system.

The user input elements may include, for example, either displayed or physical dials, switches, buttons, touch screens, keyboards, a mouse, joysticks, cursor control devices ("CCDs"), game controllers, virtual reality, augmented reality, or mixed reality input/output devices, or any other multi-function controllers, keypads, and input devices. The input elements may be configured to, for example, enable the user 108 to interact with the displayed data, including controlling the user entity and aspects of the user entity and components of the user entity. For example, in the case of the user entity being a user aircraft, the input elements may enable the user 108 to fly the user aircraft, communicate with other aircraft, target other aircraft or targets with a weapons system of the user aircraft, adjust a radio setting of a virtual communications device of the user aircraft, and so on. In another example, the user input can cause the user entity to engage the synthetic entity, and the engagement may be one of a positional maneuver, a targeting operation, and a firing of a munition at the synthetic entity.

The user database 112 stores data relating to user information and prior user information. The user database 112 may be internal or external to the intelligent adaptation processing system 102. In some embodiments, the user database 112 may be comprised of one or more networked computers. In some embodiments, the prior user information is information from a plurality of different users. In some embodiments, the user 108 and the prior user are the same person. For example, the user database 112 may store only information from prior interactions of the user 108 with the system 100 where the system 100 modifies pre-scripted content only based on the information from prior interactions of the user 108. In another example, the user database 112 stores information related to prior interactions of the user 108 and other users (e.g., a community of users) and the system 100 modifies pre-scripted content based on information related to prior interactions of the user 108 and the other users. The prior user information includes at least one of a prior user input and a prior physiological state of the prior user received in response to an interaction of the prior user with the same, similar, or different pre-scripted scheme.

Figure 2:
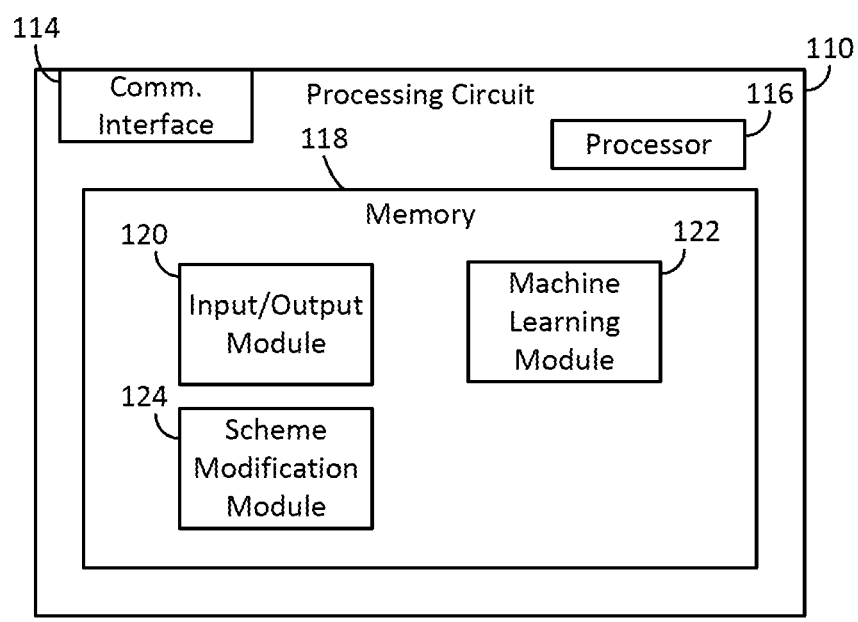
FIG. 2 is a block diagram of an exemplary embodiment of a processing circuit of the artificial intelligence adaptation system of FIG. 1.

Referring now to FIG. 2, a block diagram of an exemplary embodiment of the processing circuit 110 of the artificial intelligence adaptation system 100 of FIG. 1 is shown according to the inventive concepts disclosed herein. The processing circuit 110 includes a communications interface 114, a processor 116, and a memory 118. The memory 118 includes various modules that cause the processor 116 to execute the systems and methods described herein, including an input/output module 120, a machine learning module 122, and a scheme modification module 124.

The communications interface 114 is configured to facilitate communications between various components of the intelligent adaption processing system 102, such as the sensor 104, the user database 112, and the input/output system 106. For example, the communications interface 114 may be configured to receive data regarding the user 108 from the sensors 104, and to communicate the data to the processor 116 via a wired or wireless connection. The communications interface 114 may include any type of wired or wireless technology for facilitating communications, including electronic and optical communication protocols.

The processor 116 may be implemented as a specific purpose processor, an application specific integrated circuit (ASIC), one or more field programmable gate arrays (FPGAs), a group of processing components, or other suitable electronic processing components. The memory 118 is one or more devices (e.g., RAM, ROM, flash memory, hard disk storage) for storing data and computer code for completing and facilitating the various user or client processes, layers, and modules described in the present disclosure. The memory 118 may be or include volatile memory or non-volatile memory and may include database components, object code components, script components, or any other type of information structure for supporting the various activities and information structures of the inventive concepts disclosed herein. The memory 118 is communicably connected to the processor 116 and includes computer code or instruction modules for executing one or more processes described herein.

The memory 118 includes various modules that cause the processor 116 to execute the systems and methods described herein. The input/output module 120 is configured to cause the input/output system 106 to accept inputs received from the user 108 or the environment of the user 108 and to output information to the user 108. For example, the input/output module 120 may be configured to receive inputs via a displayed or physical dial, switch, button, touch screen, keyboard, a mouse, joystick, cursor control device, game controller, and a virtual reality, augmented reality, or mixed reality input/output device operated by the user 108 in response to content displayed by the display. The input/output module 120 is also configured to output information to the user 108 by causing content to be outputted by the input/output system 106, for example, via a display screen, speaker, haptic feedback device, and so on. The input/output module 120 communicates with the input/output system 106 via the communications interference 114.

In one embodiment, the input/output module 120 is configured to display content, via the input/output system 106, including an environment, a synthetic entity, a user entity controllable by the user 108 with respect to the environment and the synthetic entity. The input/output module 120 is further configured to display and operate the environment and the synthetic entity according to a pre-scripted scheme (e.g., according to a training exercise, according to a preset set of instructions or code). The input/output module 120 is further configured to receive, via the input/output system 106, user information. In some embodiments, the user information comprises a user input (e.g., a command or control input via an input device such as a joystick or touchpad). In some embodiments, the user information may include a sensor input from the sensor 104. For example, the sensor input may indicate a current physiological state of the user 108.

The machine learning module 122 is configured to process all received information (e.g., user information, user inputs, sensor inputs) to determine a current state or likely behavior or action of the user 108 with respect to the displayed content and to communicate information regarding the modification to the scheme modification module 124. In one embodiment, the machine learning module 122 is configured to determine a current physiological state of the user 108 indicative of the user 108 being at least one of bored, inattentive, underworked, overworked, and challenged. For example, the machine learning module 122 can determine a physiological state of the user based on data received from the sensor 104, such as at least one of an eye gaze, eye focus, entropy, blink rate, heart rate, heart rate variability, and perspiration of the user 108. In one embodiment, the machine learning module 122 determines a modification for the pre-scripted scheme based on the physiological state of the user 108 and an environmental context for the user 108. In some embodiments, the machine learning module 122 determines a workload of the user 108 or an attentional state of the user 108 with respect to the displayed content.

In one embodiment, the machine learning module 122 determines a predicted action of the user entity based on the user information. In some embodiments, the predicted action is a likely action (e.g., the machine learning module 122 determines that the user 108 is more likely to take a first action over a second action). The machine learning module 122 can determine the predicted action based on historical user data stored in the user database 112, user data of the user 108, or a combination of the historical user data and data of the user 108. The historical user data may be data compiled based on interactions of other users with the same pre-scripted scheme or a different pre-scripted scheme.

In one embodiment, the machine learning module 122 is configured to determine a set of possible modifications for the pre-scripted scheme based on the received user information. The machine learning module 122 can rank the possible modifications by a difficulty level, select a modification based on a comparison of the difficulty level and an experience level of the user 108, and modify the pre-scripted scheme according to the selected modification. In some embodiments, the selected modification tests a specific skill of the user 108 (e.g., engine failure response, evading targeting, responding to radar jam). The machine learning module 122 can use machine learning algorithms to determine a current state or likely behavior or action of the user 108 with respect to the displayed content.

The scheme modification module 124 is configured to modify the pre-scripted scheme. The scheme modification module 124 can modify the pre-scripted scheme based on information received from or determined by the machine learning module 122, such as the current state or likely behavior or action of the user 108 with respect to the displayed content. The scheme modification module 124 can modify the pre-scripted scheme based on the user information and the prior user information stored in the user database 112. In some embodiments, the scheme modification module 124 modifies the pre-scripted scheme based on prior user information indicative of a prior user input and a prior physiological state of the prior user. In some embodiments, the prior user input and a prior physiological state of the prior user is received in response to an interaction of the prior user with the same pre-scripted scheme. In some embodiments, the prior user input and a prior physiological state of the prior user is received in response to an interaction of the prior user with a different pre-scripted scheme. In some embodiments, the prior user input and a prior physiological state of the prior user is received in response to an interaction of the prior user with a pre-scripted scheme that is either similar to the same pre-scripted scheme that the user 108 is currently interacting with or in response to an interaction of the prior user with a pre-scripted scheme that trains, teaches, or tests a similar skill that the current pre-scripted scheme trains, teaches, or tests.

The scheme modification module 124 can modify the pre-scripted scheme by modifying at least one of a weather characteristic of the environment and a terrain feature or terrain effect of the environment. The scheme modification module 124 can modify the pre-scripted scheme by modifying an operation of the synthetic entity. For example, the operation may be at least one of a maneuver, an operation of a weapons system, a change of a selection of an equipment item of the synthetic entity, and a change in operation of an equipment item of the synthetic entity. The operation of the synthetic entity may be in accordance with an actual tolerance, value, or maneuver that the type of object or vehicle that the synthetic entity represents could perform in real life. For example, if the synthetic entity represents an F-16 Fighter, the synthetic entity will operate according to a possible real-world tolerance, value, or maneuver that a real-world F-16 Fighter could perform. As such, the inventive concepts disclosed herein enable changing an action of the synthetic entity while staying true to a possible real-world behavior or action. The scheme modification module 124 can modify the pre-scripted scheme to deactivate, malfunction, or activate an item of user equipment associated with or user entity according to the pre-scripted scheme. The scheme modification module 124 can modify the pre-scripted scheme based on a predicted action of the user entity as determined by the machine learning module 122.

The scheme modification module 124 can modify the pre-scripted scheme by adding at least one additional synthetic entity or removing at least one synthetic entity from the environment (e.g., adding an additional enemy combat aircraft), modifying a behavior or action of at least one synthetic entity, and modifying an aspect of the user entity (e.g., jamming a radar system of the user entity, causing a targeting system of the user entity to malfunction). For example, in one embodiment, the scheme modification module 124 can modify the pre-scripted scheme based on the synthetic entity detecting that it is being jammed in a specific way and reacting in a new way in response, such as switching radio frequencies.

The scheme modification module 124 can modify the pre-scripted scheme to be more complex and therefore more challenging for the user 108 than the pre-scripted scheme. For example, in the context of a combat flight simulator, the scheme modification module 124 can modify the pre-scripted scheme to include additional synthetic entities hostile to the user entity. In another example, the scheme modification module 124 can modify the pre-scripted scheme to reconfigure spawning locations of synthetic entities that respawn (e.g., when killed, terminated, or incapacitated).

In some embodiments, modification of the pre-scripted scheme can be toggled on or off by the user 108, another person (e.g., an instructor), or by the system 100 itself based on determining that the user 108 is experiencing a sufficient workload. In some embodiments, the scheme modification module 124 is configured to modify the pre-scripted scheme to be less challenging for the user 108 (e.g., by removing a hostile entity, by repairing a damaged item of user equipment) in response to the machine learning module 122 determining that the user 108 is overworked or experiencing stress exceeding a stress level threshold. In some embodiments, the modification is specific to user data of the user 108 (e.g., based on actions and performance of the user 108 in the past). In some embodiments, the modification is based on user data of the user 108 and other prior users.

In some embodiments, the modification is based on a combination of inputs or states of the synthetic entity, such as a configuration of the synthetic entity aircraft, whether the synthetic entity fired any munitions and if so how many (e.g., based on knowing that the synthetic entity has a certain number of munitions remaining or no munitions remaining), a radar mode of the synthetic entity, a current altitude of the synthetic entity, a communication frequency used by the synthetic entity frequencies, and a radar setting of the synthetic entity. In some embodiments, the modification is based on the actions and states of multiple synthetic entities present in the synthetic environment. In some embodiments, the modification is a new or updated objective for the user 108 to complete (e.g., a mission, target, responding to a new threat or previously unknown threat).

In some embodiments, scheme modification module 124 is configured to alert a trainer or instructor, via the input/output system 106, that the trainer or instructor should manually intervene (e.g., to troubleshoot, manually modify the pre-scripted scheme, make a selection regarding the pre-scripted scheme).

Figure 3:
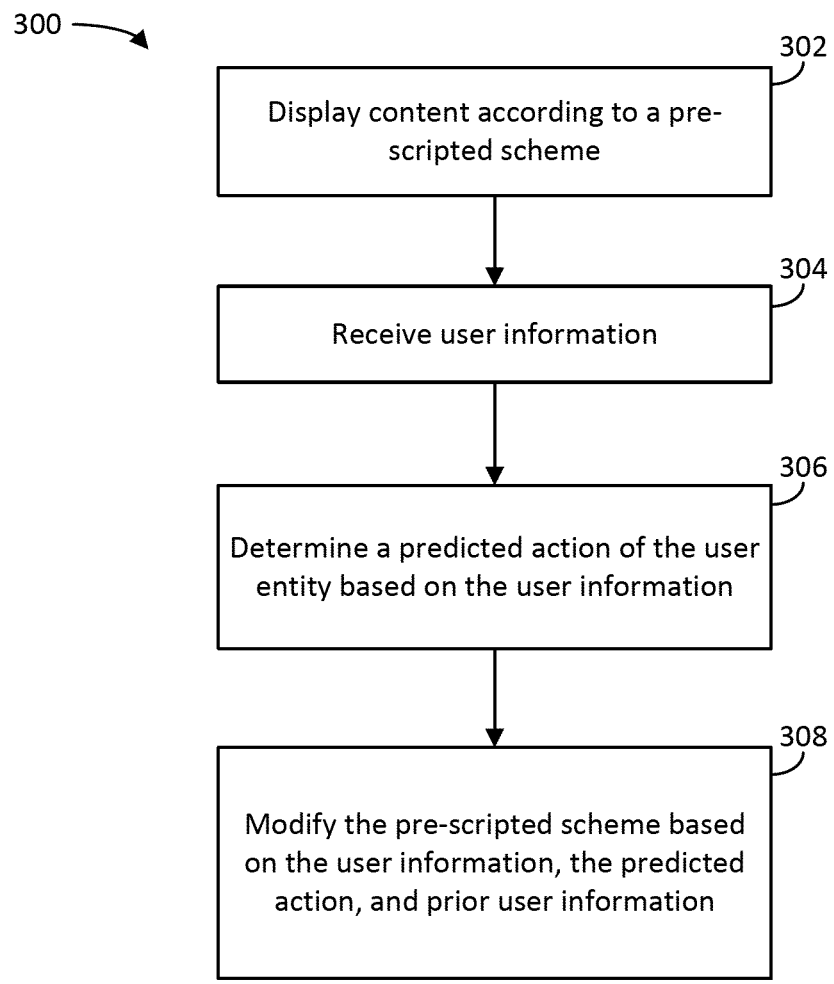
FIG. 3 is a diagram of an exemplary embodiment of a method of modifying a pre-scripted scheme using the artificial intelligence adaptation system of FIG. 1.

Referring now to FIG. 3, an exemplary embodiment of a method according to the inventive concepts disclosed herein may include one or more of the following steps.

A step (302) may include displaying content including an environment, a user entity, and a synthetic entity. The user entity is controllable by the user 108 with respect to the environment and the synthetic entity. The environment and the synthetic entity operate according to a pre-scripted scheme. In some embodiments, the user entity is associated with user equipment operating according to the pre-scripted scheme. In some embodiments, the environment is a training environment relating to at least one of combat training and commercial aviation.

A step (304) may include receiving user information. The user information is at least one of a user input and a current physiological state of the user 108. The current physiological state of the user 108 can indicate that the user 108 is at least one of bored, inattentive, underworked, overworked, and challenged. In some embodiments, the current physiological state of the user 108 is determined based on data received from the sensor 104 where the sensor 104 is configured to measure at least one of eye gaze, eye focus, entropy, blink rate, heart rate, heart rate variability, and perspiration of the user 108. In some embodiments, the user input causes the user entity to engage the synthetic entity and the engagement includes at least one of a positional maneuver, a targeting operation, and a firing of a munition at the synthetic entity.

A step (306) may include determining a predicted action of the user entity based on the user information. The predicted action is based on an input from the sensor 104 and an input from the user 108. The predicted action can be a likely action of the user entity. For example, the machine learning module 122 may determine that the user 108 is more likely to take a first action over a second action. The predicted action can be determined based on historical user data stored in the user database 112.

A step (308) may include modifying the pre-scripted scheme based on the user information, the predicted action, and prior user information. The prior user information is at least one of a prior user input and a prior physiological state of the prior user received in response to an interaction of the prior user with the pre-scripted scheme. In some embodiments, modifying the pre-scripted scheme includes modifying at least one of a weather characteristic of the environment and a terrain feature or terrain effect of the environment. In some embodiments, modifying the pre-scripted scheme includes modifying an operation of the synthetic entity where the operation includes at least one of a maneuver, an operation of a weapons system, a change of a selection of an equipment item of the synthetic entity, and a change in operation of an equipment item of the synthetic entity. In some embodiments, modifying the pre-scripted scheme includes at least one of a deactivation, a malfunction, or an activation of the user equipment. In some embodiments, modifying the pre-scripted scheme is based on a predicted action of the user entity.

Figure 4:
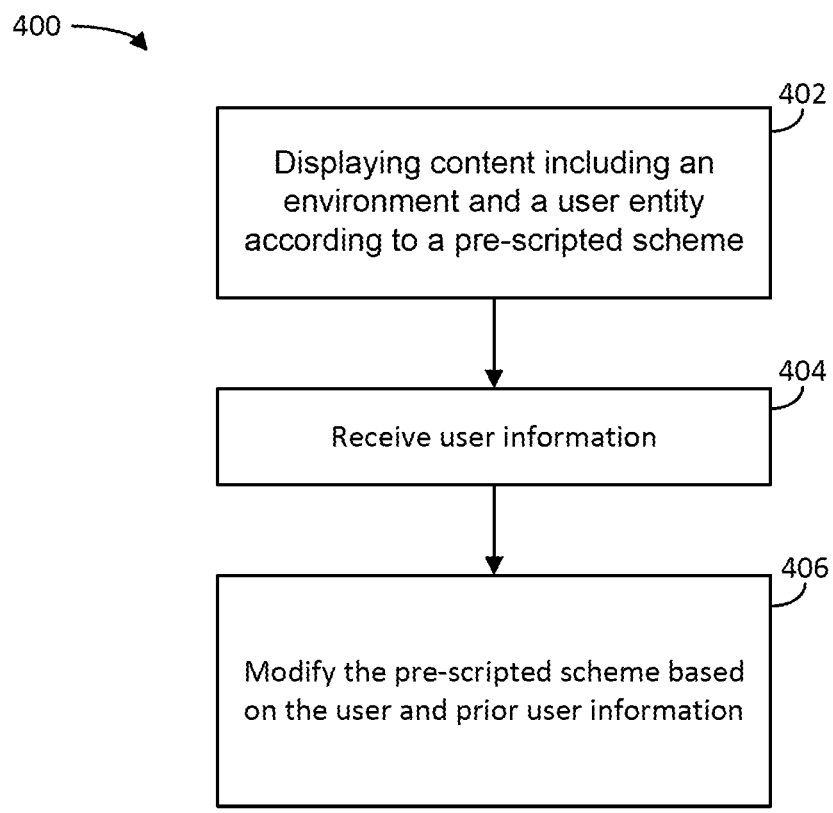
FIG. 4 is a diagram of an exemplary embodiment of another method of modifying a pre-scripted scheme using the artificial intelligence adaptation system of FIG. 1.

Referring now to FIG. 4, an exemplary embodiment of another method according to the inventive concepts disclosed herein may include one or more of the following steps.

A step (402) may include displaying content including an environment and a user entity. The user entity is controllable by the user 108 with respect to the environment. The environment operates according to a pre-scripted scheme. The environment can be a commercial flight simulation environment and the user entity can be a simulated commercial aircraft in the commercial flight simulation environment. In some embodiments, the user 108 is positioned inside of a commercial flight simulator.

A step (404) may include receiving user information. The user information is at least one of a user input and a current physiological state of the user 108. For example, the user input can cause the user entity to change course, change altitude, maneuver the user entity, or change a setting of user equipment associated with the user entity (e.g., change radio frequencies, increase thrust).

A step (406) may include modifying the pre-scripted scheme based on the user information and prior user information. The prior user information is at least one of a prior user input and a prior physiological state of the prior user received in response to an interaction of the prior user with the pre-scripted scheme. In some embodiments, modifying the pre-scripted scheme includes one of causing an action to occur such as a blown engine, a malfunctioning radar system, and a malfunctioning communications system.

As will be appreciated from the above, intelligently adapting entities and intelligently adapting environments using an artificial intelligence adaptation system according to embodiments of the inventive concepts disclosed herein may better train human trainees by creating unpredictable situations without requiring real-time external input from a human trainer, provide more challenging gameplay by unpredictably changing the way synthetic entities respawn and respond to user entity actions, enabling real-world mission planning (e.g., by using the inventive concepts disclosed here to learn how non-friendly entities may react in certain scenarios) and creation of backup strategies. It will be appreciated that the inventive concepts disclosed herein may be employed in any type of setting for any purpose, including use for military, commercial, gaming, training, simulators, and mission planning. The inventive concepts disclosed herein provide for more complex and challenging training and simulation scenarios for a user and enabling increased opportunities for knowledge acquisition and increased realism of synthetic entities and synthetic environments.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An artificial intelligence method, comprising:
    displaying, by a flight simulator system, content including an environment, a user entity representing a user aircraft, and a plurality of synthetic entities representing combat aircraft, the user entity representing the user aircraft controllable by a user with respect to the environment and the plurality of synthetic entities representing the combat aircraft, the environment and the plurality of synthetic entities representing the combat aircraft operating according to a pre-scripted scheme, the user positioned inside the flight simulator system having one or more physical input elements;
    receiving user information, the user information being at least one of a user input, and a current physiological state of the user;
    using machine learning algorithms to process the user information and determine a predicted action of the user entity based on the user information and an experience level of the user, wherein the user information further comprises at least one of historical user data stored in a user database, user data of the user, and a combination of the historical user data and the user data of the user; and
    modifying the pre-scripted scheme based on the user information, the predicted action of the user entity representing the user aircraft, and prior user information, the prior user information comprising at least one of a prior user input and a prior physiological state of a prior user received in response to an interaction of the prior user with the pre-scripted scheme, wherein modifying the pre-scripted scheme tests an experience level of the user,
    wherein modifying the pre-scripted scheme comprises modifying an operation of the user entity representing the user aircraft to jam a radar system of the user entity representing the user aircraft causing a targeting system of the user entity representing the user aircraft to malfunction based on the current physiological state of the user indicative of the user being at least one of bored, inattentive, or underworked.

2. The method of claim 1, wherein the current physiological state of the user is determined based on data received from a sensor, the sensor configured to measure at least one of eye gaze, eye focus, entropy, blink rate, heart rate, heart rate variability, and perspiration.

3. The method of claim 1, wherein modifying the pre-scripted scheme comprises modifying at least one of a weather characteristic of the environment and a terrain feature or terrain effect of the environment.

4. The method of claim 1, wherein the operation comprises at least one of a maneuver, an operation of a weapons system, a change of a selection of an equipment item of the synthetic entity, and a change in operation of an equipment item of the synthetic entity.

5. The method of claim 1, wherein the user input is received from the one or more physical input elements and causes the user entity to engage the plurality of synthetic entities, the engagement comprising at least one of a positional maneuver, a targeting operation, and a firing of a munition at the synthetic entities.

6. The method of claim 1, wherein the environment is a training environment, the training environment relating to at least one of combat training and commercial aviation.

* * * * *